US008646520B2

(12) United States Patent
Chen

(10) Patent No.: US 8,646,520 B2
(45) Date of Patent: Feb. 11, 2014

(54) PRECISION MARKING OF SUBSURFACE LOCATIONS

(75) Inventor: Songhua Chen, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 288 days.

(21) Appl. No.: 13/048,473

(22) Filed: Mar. 15, 2011

(65) Prior Publication Data

US 2012/0234533 A1 Sep. 20, 2012

(51) Int. Cl.
*E21B 47/12* (2012.01)
*G01V 3/26* (2006.01)

(52) U.S. Cl.
USPC ........................ 166/66.5; 166/254.1; 324/346

(58) Field of Classification Search
USPC ............ 166/66.4, 66.5, 254.1, 254.2, 250.12; 175/294; 324/346
See application file for complete search history.

(56) References Cited

U.S. PATENT DOCUMENTS

| | | | |
|---|---|---|---|
| 2,337,269 A | 12/1943 | Piety | |
| 2,467,136 A | 7/1949 | Doll | |
| 2,476,137 A | 7/1949 | Doll | |
| 2,550,004 A | 4/1951 | Doll | |
| 2,770,736 A | 11/1956 | Krasnow | |
| 3,566,979 A | 3/1971 | Bennett et al. | |
| 4,572,293 A * | 2/1986 | Wilson et al. | 166/250.01 |
| 4,656,422 A | 4/1987 | Vail, III et al. | |
| 5,052,491 A * | 10/1991 | Harms et al. | 166/304 |
| 5,279,366 A * | 1/1994 | Scholes | 166/254.2 |
| 5,753,813 A | 5/1998 | Hagiwara | |
| 6,125,934 A | 10/2000 | Lenn et al. | |
| 6,333,699 B1 | 12/2001 | Zierolf | |
| 6,408,943 B1 * | 6/2002 | Schultz et al. | 166/285 |
| 6,516,663 B2 | 2/2003 | Wong | |
| 6,645,769 B2 * | 11/2003 | Tayebi et al. | 436/56 |
| 7,204,308 B2 | 4/2007 | Dudley et al. | |
| 7,703,515 B2 | 4/2010 | Chouzenoux et al. | |
| 8,016,036 B2 * | 9/2011 | Kirkwood et al. | 166/255.1 |
| 8,087,476 B2 * | 1/2012 | Wassell et al. | 175/40 |
| 2002/0179301 A1 * | 12/2002 | Schultz et al. | 166/250.01 |
| 2002/0195247 A1 | 12/2002 | Ciglenec et al. | |
| 2003/0192691 A1 * | 10/2003 | Vinegar et al. | 166/250.12 |
| 2005/0097911 A1 | 5/2005 | Reellat et al. | |
| 2005/0194132 A1 | 9/2005 | Dudley et al. | |
| 2006/0005965 A1 | 1/2006 | Chouzenoux et al. | |
| 2006/0102345 A1 * | 5/2006 | McCarthy et al. | 166/250.1 |
| 2006/0177879 A1 | 8/2006 | Mayes et al. | |
| 2007/0056771 A1 | 3/2007 | Gopalan et al. | |

(Continued)

FOREIGN PATENT DOCUMENTS

| | | | |
|---|---|---|---|
| EP | 0984135 | A2 | 8/1999 |
| EP | 1045113 | A1 | 10/2000 |

(Continued)

OTHER PUBLICATIONS

PCT/US2012/026690—International Search Report and Written Opinion dated Dec. 14, 2012.

*Primary Examiner* — Kenneth L Thompson
(74) *Attorney, Agent, or Firm* — Mossman, Kumar & Tyler, PC

(57) ABSTRACT

A method for performing a downhole operation includes marking at least one location in a wellbore using a magnetized material. The magnetized material may generate a magnetic field stronger than a magnetic field generated in the wellbore by a surrounding formation.

19 Claims, 2 Drawing Sheets

(56) References Cited

U.S. PATENT DOCUMENTS

| | | | | |
|---|---|---|---|---|
| 2007/0119959 | A1 | 5/2007 | McHardy et al. | |
| 2009/0120637 | A1 | 5/2009 | Kirkwood et al. | |
| 2009/0288820 | A1* | 11/2009 | Barron et al. | 166/249 |
| 2010/0147512 | A1* | 6/2010 | Cramer et al. | 166/250.1 |
| 2012/0138291 | A1* | 6/2012 | Tomberlin et al. | 166/254.2 |
| 2013/0020066 | A1* | 1/2013 | Ocalan et al. | 166/66.5 |

FOREIGN PATENT DOCUMENTS

| | | | |
|---|---|---|---|
| EP | 1662673 | A1 | 5/2006 |
| GB | 2360533 | A | 9/2001 |
| GB | 2404208 | A | 1/2005 |
| WO | WO 2011063023 | A3 * | 10/2011 |

* cited by examiner

PRECISION MARKING OF SUBSURFACE LOCATIONS

BACKGROUND OF THE DISCLOSURE

1. Field of the Disclosure

This disclosure relates generally to devices, systems and methods for positioning and using equipment used in connection with subsurface operations.

2. Description of the Related Art

Boreholes drilled in subsurface formation can include complex three-dimensional trajectories and intersect various formations of interest. Moreover, these boreholes may be hundreds or thousands of meters in length. In many instances, it is desirable to accurately position a well tool in a well or accurately identify a feature along these boreholes. The present disclosure is directed to methods and devices for accurately identifying or locating a depth or location along a borehole.

SUMMARY OF THE DISCLOSURE

In aspects, the present disclosure provides a method for performing a downhole operation. The method may include marking at least one location in a wellbore using a magnetized material. The magnetized material may generate a magnetic field stronger than a magnetic field generated in the wellbore by a surrounding formation.

It should be understood that examples of the more important features of the disclosure have been summarized rather broadly in order that the detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, references should be made to the following detailed description of the preferred embodiment, taken in conjunction with the accompanying drawings, in which like elements have been given like numerals and wherein.

DETAILED DESCRIPTION OF THE DISCLOSURE

Figure 1:
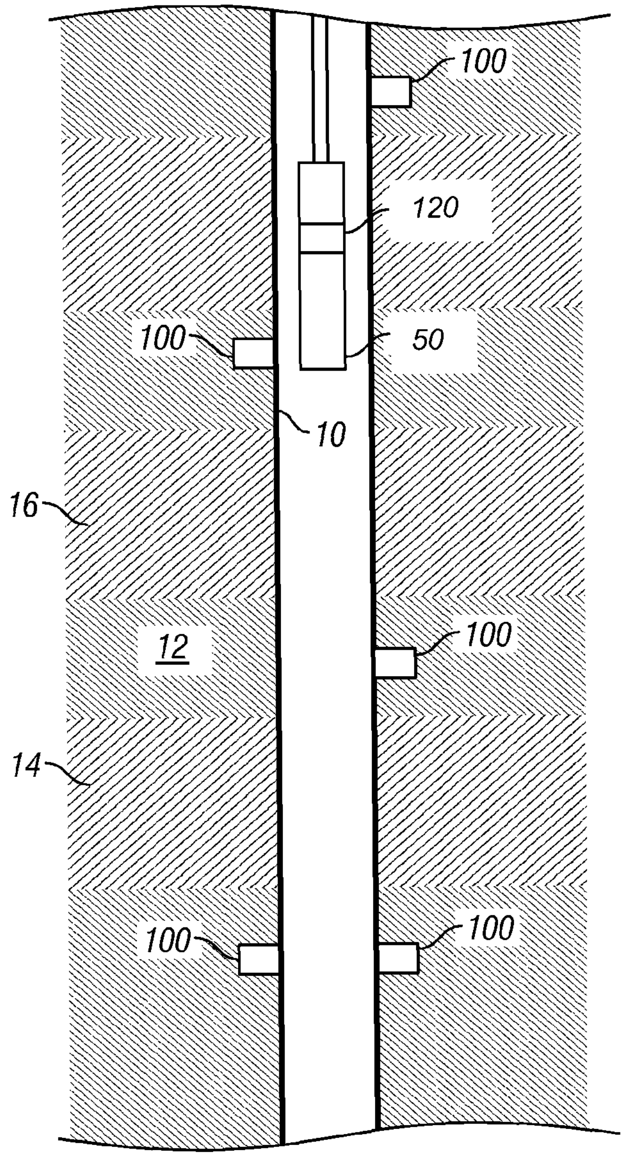
FIG. 1 schematically illustrates a marker according to one embodiment of the present disclosure that is embedded along several locations along a wellbore in a subterranean formation.

The present disclosure, in one aspect, relates to devices and methods for estimating depth and/or identifying a location along a borehole. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein.

Referring initially to FIG. 1, there is shown a wellbore 10 intersecting a formation 12. In embodiments, one or more markers 100 are positioned along the wellbore 10. The markers 100 operate as a reference object or device that may assist in locating, orienting and/or positioning one or more tools deployed in the wellbore 10. The markers 100 may be positioned in a wellbore tubular (e.g., casing, liner, production tubing, etc.), in the earth of an adjacent formation, in wellbore equipment (e.g., sandscreen, packers, etc.), in wellbore materials fluids (e.g., cement, gravel packs, etc.) or any other desired wellbore location. The wellbore 10 may be for hydrocarbon recovery, geothermal application, water production, tunnels, mining operations, or any other uses.

As will be discussed in greater detail below, the markers 100 may be used for precision depth measurement during wireline logging activities and/or for positioning of logging or formation tester/sampling tools, such as formation tester probe(s) and/or packers. By marking a target location with the marker 100, formation fluid samples may be taken by tools that are precisely stopped at a desired location. Embodiments of the present disclosure provide a compact, high-precision depth positioning device that delivers straightforward results, instead of relying on methods, such as a reference log interpretation which may be subject to interpretation.

Figure 2:
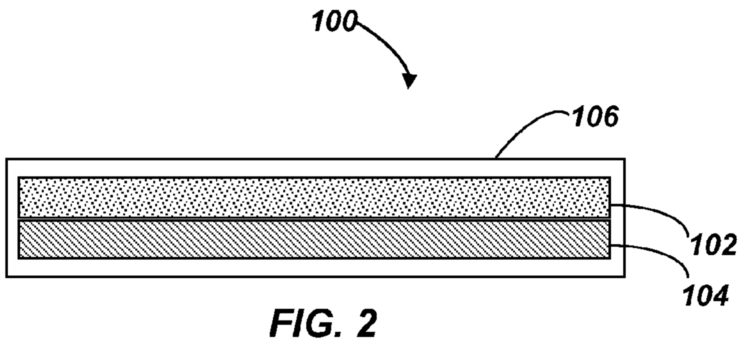
FIG. 2 schematically illustrates a reference marker according to one embodiment of the present disclosure.

Referring now to FIG. 2, there is shown one embodiment of a marker 100 that exhibits a functionally effective magnetic contrast with a surrounding formation. By "functionally effective" magnetic contrast, it is meant that the magnetic signature of the marker 100 is discernable in quality and strength over magnetic fields associated with the surrounding formation. In one embodiment, the marker 100 may be formed as a microchip that may include a magnetic material 102 that is mounted on a substrate 104. The magnetic material 102 may be covered by one or more coatings 106. The coating 106 may be magnetically transparent and may be used to partially or completely encapsulate and protect the marker 100. Certain earth formations contain diamagnetic and paramagnetic minerals. Also, the formation may have ferromagnetic or ferromagnetic materials. Thus, embodiments of the present disclosure use material or materials that have significantly higher magnetic susceptibility in order to eliminate the ambiguity caused by fluctuation of rock mineral variations. Most commonly occurring minerals in sandstone and carbonate (quartz, feldspar, calcite, dolomite, halite, anhydrite, gypsum, and kaolinite), as well as reservoir fluids (crude oil and water), are diamagnetic. Clay minerals, on the other hand, often are paramagnetic with mass magnetic susceptibility ranging from $10^{-7}$ $m^3$/kg (muscovite) to $10^{-6}$ $m^3$/kg (siderite). Some embodiments of the present disclosure may use a material that has at least a three-order of magnetic susceptibility contrast to distinguish from those of formation minerals. For example, nanoparticles that include spinel ferrites that exhibit magnetic susceptibility three orders of magnitude higher than that of siderite, reaching $40{,}700\times10^{-8}$ $m^3$/kg, may be used. Illustrative spinel ferrites ($Fe_2O_4$) include, but are not limited to, $CoFe_3O_4$, $MgFe_2O_4$, $MnFe_2O_4$, $CoCrFe_2O_4$. In certain embodiments, the magnetic material may be in the form of superparamagnetic microspheres that incorporate nanometer-sized iron oxide crystals into micron-sized polymer particles. These materials may be solid and/or entrained in a fluid medium (e.g., liquid or gas).

While a generally rectangular marker is shown, it should be understood that the marker 100 may be formed as beads, rods, or any other suitable shape. Moreover, while a generally solid device is depicted, it should be appreciated that the magnetic material may be entrained in a liquid medium. Also, certain embodiments may incorporate nanosensor technology and/or MEM (micro-electromechanical) technology to form a compact depth marker. For example, these markers 100 may be formed on the scale of centimeters, millimeters, or smaller.

In some embodiments, the number of the markers 100 can be varied to form a unique sensitivity for a particular location along the wellbore 10. Thus, for example, a first location may include one marker, a second location may include two markers, a third location may include three markers, etc. Thus, each location may be identified by a particular intensity, value, or relative value of magnetic susceptibility.

Referring still to FIG. 2, the marker 100 may use an electromagnetic (EM) signature, signal, or response. For example, instead of a magnetic material 102, an EM marker may be a resonant circuit (RLC circuit) or a microwave (MW) resonant cavity device that may use either a conventional circuit or a nano-fabricated MEM device. The RLC circuit or the MW resonant cavity device may be tuned to a designated frequency. During the logging pass when the depth positioning is required, an EM signal emitter may emit the EM signal with a frequency that is the same as or similar to the marking device's resonance frequency. As the emitter moves close to the marker, the resonance signal will be stronger and thus allow the marker to be located. Each marker can be tuned to a different resonant frequency. Thus, the emitter can be switched to a different frequency to precisely identify a specific marker. Such an embodiment may be useful when multiple markers are positioned in close proximity.

The marker 100 may be used to orient and/or position a wellbore tool with reference to a location parameter such as measured depth, true vertical depth, borehole highside, azimuth, etc. The orientation and/or position may also be with reference to a subsurface feature such as a production zone, a water zone, a particular point or region of interest in the formation, as well as features such a bed boundaries, fluid contacts between fluids (e.g., water and oil), unstable zones, etc.

Any number of methods and devices may be used to position or fix the marker 100 in the wellbore 10. For example, the marker 100 may be physically embedded or planted in an earth formation making up a borehole wall. For example, the marker 100 may be pressed or injected into place. Also, an adhesive, a bonding agent, or another similar material may be used to secure the marker 100 in place. The marker 100 may also be secured to a wellbore tubular. For example, the marker 100 may be attached to an inner wall of a casing. In other arrangements, the marker 100 may be installed in the wellbore tubular before the tubular is conveyed into the wellbore 10. In certain embodiments, the markers 100 may be placed in the pores of an earth formation.

Figure 3:
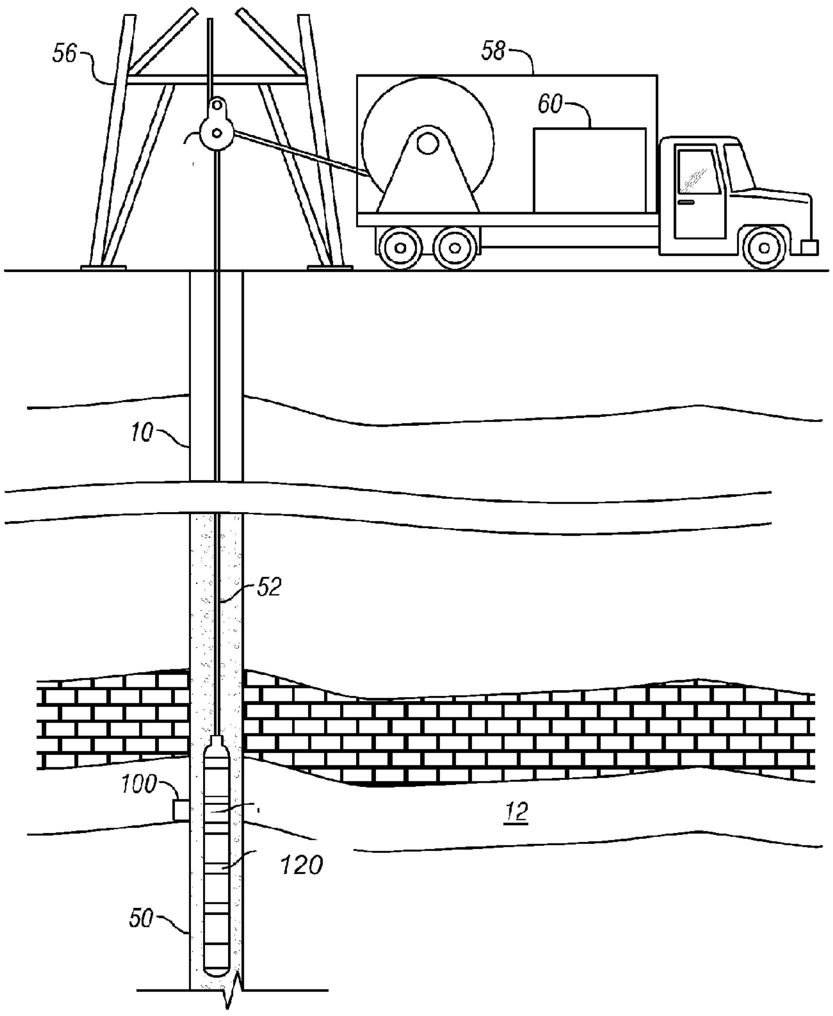
FIG. 3 shows a schematic view of a marking system conveyed by a non-rigid carrier according to one embodiment of the present disclosure.

It should be appreciated that using the markers 100 to identify one or more locations may increase the precision by which tools can be positioned in the wellbore 10. Non-limiting and illustrative uses will be described with reference to FIG. 3, which schematically represents a cross-section of the formation 12 intersected by a drilled wellbore 10. A formation evaluation tool 50 may be suspended within the wellbore 10 by a carrier 52. The carrier 52 may be a data-conducting wireline supported by a derrick 56. A control panel 60 communicates with the tool 50 through the carrier 52. Personnel my use the control panel 60 to transmit electrical power, data/command signals, and to control operation of the tool 50. The tool 50 may include a marker detector 120 that is configured to locate the markers 100. The detector 120 may be a low-field magnetic susceptibility meter or a magnetometer logging device. Generally speaking, the detector 120 may be any device that generates information in response to a magnetic field. The information may be a value, a relative value, a change in a value, etc.

The markers 100 may have been positioned in the wellbore 10 during prior wellbore operations. For instance, markers 100 emitting a unique signal may have been previously positioned during drilling operations to identify the location of features of interest to well owners and operator such as potential pay zones, depleted zones, unstable zones, “thief” zones (e.g., zones having relatively low pore pressures), etc. The markers 100 may have been positioned during completion operations to identify locations of perforating tools, screens, gravel packs, zone isolation equipment such as packers, production tubing, artificial lift pumps, etc.

In one mode of use, the tool 50 may be conveyed along the wellbore 10 while surface personnel monitor the detector 120. For example, the detector 120 may transmit signals representative of a detected magnetic field to the surface. Personnel may evaluate a received signal to determine the position of the tool 120. For formation sampling operations, personnel may monitor the information provided by the detector 120 to identify a specific zone from which a sample is to be taken. Such a zone may be uniquely identified by a specially configured magnetic marker 100.

In another mode of use, the tool 50 may be conveyed along the wellbore 10 while a downhole controller monitors the detector 120 in a closed loop fashion. For example, the downhole controller may have pre-programmed instructions that compare signals from the detector 120 with a programmed reference signal or signals. The downhole controller may be programmed to execute one or more tasks upon detecting a specified condition.

It should be appreciated that this positioning method eliminates the uncertainty of other positioning methods, such as those that use the synchronization of two logging passes, which can be compromised by cable tension variations. Furthermore, by using a stationary magnetic signal as a positioning reference frame, positioning errors due to cable creeping may be minimized or eliminated. Additionally, laminated thin-beds can be more accurately located with a stationary marker than by techniques such as those using accelerometer measurements, gamma ray logs, or microresistivity logs.

Embodiments of the present disclosure may also be configured for use during drilling operations. For example, the marker and marker detector may be deployed with drill string that includes a drilling assembly. The drill string may include jointed tubular, coiled tubing, casing joints, liner joints, tubular with embedded signal conductors, or other equipment used in well completion activities.

The term “carrier” as used herein means any device, device component, combination of devices, media and/or member that may be used to convey, house, support or otherwise facilitate the use of another device, device component, combination of devices, media and/or member. Illustrative “carriers” include wirelines, wireline sondes, slickline sondes, e-lines, jointed drill pipe, coiled tubing, wired pipe, casing, liners, drop tools, etc.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. It is intended that the following claims be interpreted to embrace all such modifications and changes.

I claim:

1. A method for performing a downhole operation, comprising:

fixing a magnetized material at at least one location along a wellbore, the magnetized material generating a magnetic field stronger than a magnetic field generated in the wellbore by a surrounding formation, wherein the at least one location includes a plurality of locations, each of the locations having a magnetized material generating a magnetic field having at least one unique characteristic, wherein the at least one unique characteristic is varied to form a unique sensitivity for each of the plurality of locations along the wellbore.

2. The method of claim 1, wherein the formation includes at least one of: (i) a diamagnetic material, and (ii) paramagnetic material.

3. The method of claim 1, wherein the magnetized material is at least partially formed of a material having a magnetic susceptibility greater than the surrounding formation.

4. The method of claim 1, wherein the magnetized material is at least partially formed as nanoparticles, wherein the nanoparticles are superparamagnetic microspheres that incorporate nanometer-sized iron oxide crystals into micron-sized polymer particles.

5. The method of claim 1, further comprising:

estimating a parameter relating to the magnetized material; and using the estimated parameter to locate the magnetized material.

6. The method of claim 5, wherein the estimated parameter is a strength of the magnetic field.

7. The method of claim 1, wherein the magnetized material is positioned in one of: (i) a cement, (ii) a wellbore wall and (iii) inside the pore space in the rock formation in the immediate vicinity of the borehole wall.

8. The method of claim 1, wherein the magnetized material includes at least a spinel ferrite.

9. The method of claim 1, wherein the plurality of locations are depths along the wellbore, and further comprising identifying depths along the wellbore by detecting each unique sensitivity.

10. An apparatus for performing a downhole operation at a selected depth along a length of a wellbore, comprising:

a magnetized material configured to be fixed along a wellbore, the magnetized material being further configured to generate a magnetic susceptibility greater than a magnetic susceptibility of a surrounding formation, the magnetized material marker being configured to generate a unique electromagnetic signal, wherein the at least one unique characteristic is variable to form a unique sensitivity for each of a plurality of depths along the wellbore; and a detector configured to detect the unique sensitivity and identify the selected depth along the wellbore.

11. The apparatus of claim 10, wherein the magnetic susceptibility is stronger than a magnetic susceptibility associated with one of: (i) a diamagnetic material, and (ii) a paramagnetic material.

12. The apparatus of claim 10, wherein the magnetized material is at least partially formed of a material having a magnetic susceptibility greater than the surrounding formation.

13. The apparatus of claim 10, wherein the magnetized material includes at least one nanoparticle, wherein the nanoparticles are superparamagnetic microspheres that incorporate nanometer-sized iron oxide crystals into micron-sized polymer particles.

14. The apparatus of claim 10, further comprising a substrate on which the at least one nanoparticle is disposed, and a coating securing the at least one nanoparticle to the substrate.

15. The apparatus of claim 10, wherein the magnetized material includes at least a spinel ferrite.

16. An apparatus for performing a downhole operation, comprising:

a plurality of markers configured to be positioned along a wellbore, each marker of the plurality of markers being positioned at a different location along the wellbore, each marker being configured to generate a unique signal in response to a received signal, wherein the at least one unique characteristic is varied to form a unique sensitivity for each of the different locations along the wellbore, wherein the unique signal is an electromagnetic signal.

17. The apparatus of claim 16, wherein each marker resonates in response to the received signal.

18. The apparatus of claim 16, wherein at least one of the plurality of markers includes one of: (i) an RLC circuit, and (ii) a microwave resonant cavity device.

19. The apparatus of claim 16, wherein each location is a depth along the wellbore, and wherein each unique sensitivity identifies the associated depth along the wellbore.

* * * * *